United States Patent [19]

Atobe

[11] Patent Number: 4,557,429
[45] Date of Patent: Dec. 10, 1985

[54] LEVEL WINDER FOR DOUBLE-BEARING REEL OF FISHING ROD

[75] Inventor: Takashi Atobe, Higashikurume, Japan

[73] Assignee: Daiwa Seiko, Inc., Higashikurume, Japan

[21] Appl. No.: 617,745

[22] Filed: Jun. 6, 1984

[30] Foreign Application Priority Data

Jul. 6, 1983 [JP] Japan ............................... 58-122866
Jul. 12, 1983 [JP] Japan ............................... 58-107894

[51] Int. Cl.⁴ ..................... A01K 89/04; A01K 89/015
[52] U.S. Cl. .................................. 242/84.42; 242/221
[58] Field of Search ............. 242/84.42, 157 R, 158 R, 242/158.3, 84.4, 221

[56] References Cited

U.S. PATENT DOCUMENTS

| 1,345,072 | 6/1920 | Case ................................. 242/84.42 |
| 1,554,132 | 9/1925 | Schmid ............................. 242/84.42 |
| 2,689,694 | 9/1954 | Hunter ............................ 242/157 R |
| 3,111,287 | 11/1963 | Baenziger ........................ 242/84.42 |

FOREIGN PATENT DOCUMENTS 671216 2/1939 Fed. Rep. of Germany ... 242/84.42
21220 12/1965 Japan .
161729 12/1957 Sweden ............................ 242/84.42

Primary Examiner—Billy S. Taylor
Attorney, Agent, or Firm—Browdy and Neimark

[57] ABSTRACT

A level winder for a double-bearing reel of a fishing rod consists of a traverse cam shaft held between portions of frame bases on side walls of the reel in front of the spool in such a manner that the cam shaft can be rotated by a driving gear on a handle shaft; a guide cylinder mounted around the cam shaft and supported between the frame bases so that the guide cylinder can rotate; a slidable member mounted around the guide cylinder, and which is able to engage with the cam shaft and move along the guide cylinder reciprocally in the lateral direction; a locking recess formed in the slidable member; a pair of guide rods supported between the side walls; right and left line guide arms which are mounted slidably on the guide rods, are urged in opposite directions by a spring, are capable of engaging with the locking recess so that a line guide hole is formed between the guide arms, and can disengage from the locking recess when the slidable member is rotated; an operating cam provided at one end of the guide cylinder; a clutch plate provided within a clutch means, and which has an operating arm which can engages with the operating cam when a pinion connected to the spool is disengaged therefrom, to turn the guide cylinder, and which can simultaneously provide both a clutch means operating action and a guide arm opening action.

2 Claims, 13 Drawing Figures

LEVEL WINDER FOR DOUBLE-BEARING REEL OF FISHING ROD

BACKGROUND OF THE INVENTION

1. Field of the Invention

This invention relates to an improvement to a level winder for a reel of a fishing rod.

2. Description of the Prior Art

In a fishing line guide member of a conventional level winder for a reel of a fishing rod, the line is let out through a line guide hole in the line guide member while the line is being payed out, and the frictional resistance generated when the line passes through the guide hole increases and hinders the paying out of the line. As a result, the performance of the reel when casting a lure at a distance is reduced, and it is difficult to cast the lure to a predetermined point accurately.

A known level winder of this kind has been designed with a view to eliminating these inconveniences, it is disclosed in Japanese Patent Publication No. 21,220/1965. In this level winder, a line guide member consisting of right and left line guide arms and a slidable element is so formed that the guide arms can be separated from the slidable element, and a line guide hole is adapted to be opened while paying out lines, so that the frictional resistance due to the guide hole is thereby reduced.

When the right and left line guide arms of this device are separated from the slidable element, the guide arms are ready to move freely along guide rods. The guide arms are moved by the tensile force in the line, so that the line guide hole is opened. However, when the lure is cast, the reel is not kept precisely horizontal it is continuously tilting in the longitudinal and lateral directions. Therefore, the two line guide arms can move along the guide rods unstably, under their own weight or the inertial force thereof, and come into contact with the line being payed out, and thereby generate frictional resistance.

In the level winder of this system, the operation of separating the line guide arms and the slidable element, so that the guide arms move reciprocally in the lateral direction, from each other must be carried out by turning the slidable element by hand directly. This means that the paying out of the line is complicated and troublesome. Moreover, if the slidable element should be turned by mistake while winding in the line, the line guide arms are separated, so that the line cannot be guided. The engagement of the guide arms with the slidable element for the winding of the line is done by bringing a traverse cam shaft and the slidable element into frictional contact with each other. Therefore, when the device has been used for a long period of time, the portions of these parts in frictional contact become worn, and extraneous matter such as seawater is deposited on these portions. As a result, a sufficiently high frictional force can not be generated. This hampers the engagement of the guide arms with the slidable element, so that the operation of the device becomes unreliable.

SUMMARY OF THE INVENTION

The present invention has been developed with a view to eliminating these faults. A first characteristic of the present invention resides in that a line guide member is formed of a pair of line guide arms, which are engaged with locking portions of a slidable member and are urged resiliently to the right and left, respectively, by a spring. Accordingly, when the line guide arms are disengaged from the slidable member to enable the casting of a lure, the guide arms are moved in opposite directions by the resilient force of the spring to and are supported by frame bases of the side walls of the reel. Thus, even when the reel is not kept exactly horizontal during casting, the two line guide arms are held on the right and left frame bases, and the line is let out smoothly without coming into contact with the guide arms. This ensures that the lure can be cast some distance easily, and to a predetermined point accurately.

The second characteristic of the present invention resides in that the disengaging of the two line guide arms from the slidable member is done in accordance with the operation of a clutch means which can engage with and disengage from a spool shaft. Therefore, when the clutch means is operated in order to pay out the line, the two line guide arms can be held in their open positions automatically and reliably.

An operating cam is mounted on one end portion of a pivotable guide cylinder around which the slidable member is mounted, and an operating arm which can engage with the operating cam is provided on a clutch plate within the clutch means. The guide cylinder is rotated simultaneously with the operation of the clutch means to rotate the locking portions of the slidable member and disengage the two line guide arms therefrom, so that the guide arms are urged in opposite directions resiliently by the spring.

A third characteristic of the present invention resides in that the slidable member, with which the pair of line guide arms engages, is constantly held in the position in which the guide arms are locked by the spring via the guide cylinder around which the slidable member is mounted. Accordingly, the guide arms can not disengage from the slidable member accidentally during fishing, and thus the line-guiding operation is not interrupted. When the operation of returning the clutch means is performed, the two line guide arms engage with the locking portions of the slidable member smoothly and reliably. This means that both the engagement and disengagement of the line guide members and the slidable member, along which the guide members can move reciprocally in the lateral direction, can be done automatically and reliably.

A fourth characteristic of the present invention resides in that the line guide arms are provided with locking pins which project therefrom and can retract thereinto on springs which are also provided in the guide arms. These locking pins can engage with a locking recess in the laterally-reciprocal slidable member and are guided by guide surfaces provided on either side of the locking recess. Accordingly, the two line guide arms slide over the guide surfaces and engage with the locking recess smoothly, because of the lateral reciprocal movements of the slidable member, to form a line guide hole through which the line can be guided smoothly.

Another characteristic of the present invention resides in that when the line is wound, it is guided along wear-resistant cylindrical members attached to the inner sides of the line guide arms, and also a wear-resistant cross-sectionally arcuate cover attached to the outer side of a front guide rod, so that the frictional resistance of the line is further reduced.

The objects as well as other advantageous features of the present invention will become apparent from the following description of a preferred embodiment thereof, with reference to the accompanying drawings.

BRIEF DESCRIPTION OF THE DRAWINGS

FIG. 3 is a partially-cutaway side elevation taken along the line I—I of FIG. 2, showing the level winder when the line is being wound in;

DESCRIPTION OF THE PREFERRED EMBODIMENT

Figure 1:
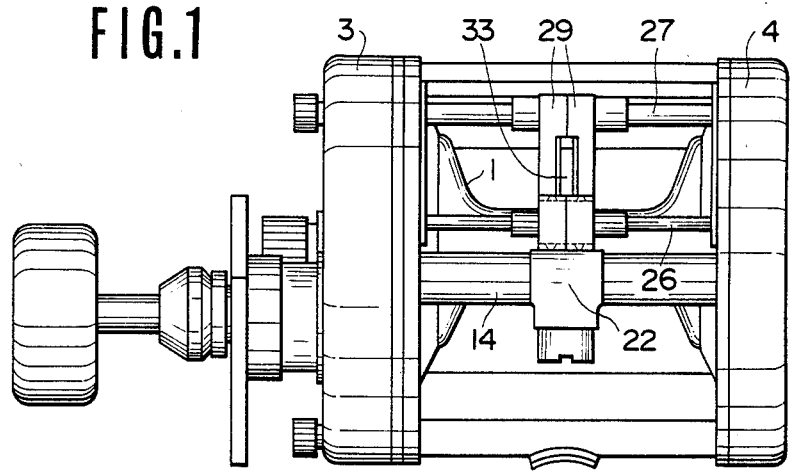
FIG. 1 is a front elevation of the present invention.
Figure 2:
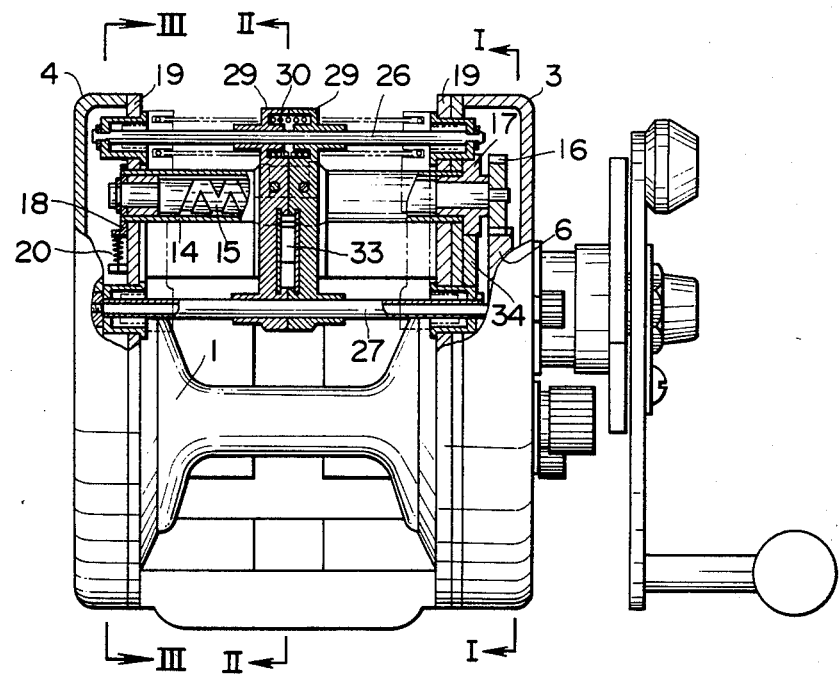
FIG. 2 is a partially-sectioned plan view of the present invention.
Figure 3:
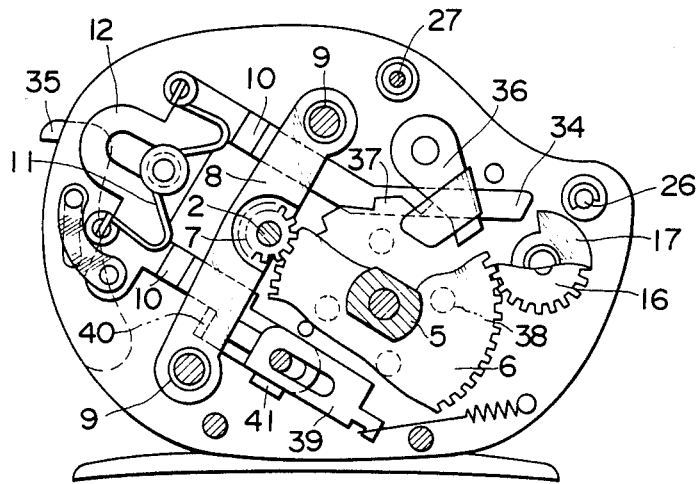
Figure 4:
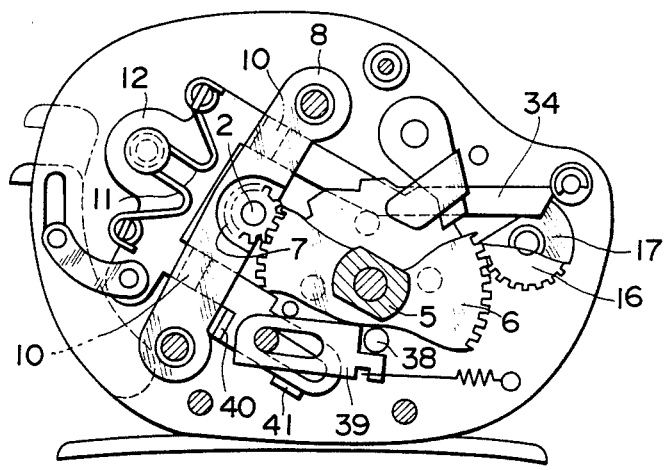
FIG. 4 is a partially-cutaway side elevation of the level winder when the line is being payed out.

An embodiment of the present invention will now be described with reference to the drawings. A spool shaft 2 on which a spool 1 is attached is supported rotatably between a pair of side walls 3, 4 of a reel. A pinion 7, which meshes with a driving gear 6 on a handle shaft 5 in a known manner, is mounted on the portion of the spool shaft 2 which is within one side wall 3 of the reel, in such a manner that the pinion 7 can be connected to or disengaged from the spool shaft 2. An operating plate engaging with the pinion 7 urges the same by springs 9 in such a manner that the pinion 7 engages with the spool shaft 2. A clutch plate 12 provided with operating projections 10, and which is biased separately to either an inner or an outer position by a dead-point spring 11, is provided slidably on the inner side of the operating plate 8. When the clutch plate is pressed toward the inner position, as shown in FIG. 4, the operating projections 10 press the operating plate 8 outward against force of the springs 9 to disengage the pinion 7 from the spool shaft 2, so that the line can be payed out. When the clutch plate 12 is in the outer position, as shown in FIG. 3, the pinion 7 is connected to the spool shaft 2, so that the line can be wound in.

A guide cylinder 14 which has a guide hole 13 on the lower side thereof is supported rotatably on front portions of frame bases 19 on the side walls 3, 4 of the reel. A traverse cam shaft 15 fits in the guide cylinder 14, and a small gear 16 meshing with the driving gear 6 is attached to the end of the traverse cam shaft 15 near the side wall 3 of the reel. An operating cam 17 is formed unitarily with the portion of the guide cylinder 14 on the inner side of the small gear 16, and a rotatable plate 18 on the other end portion thereof. A spring 20 is provided between the rotatable plate 18 and the frame base 19 on the side wall 4 so as to retain the guide cylinder 14 in such a manner that the guide hole 13 faces downward.

A slidable member 21 is mounted onto the outer circumferential surface of the guide cylinder 14, and a locking claw 22 provided on the inner side of the slidable member 21 engages with a threaded recess in the traverse cam shaft 15 through the guide hole 13. A locking recess 24, which is provided with notches 23 at the inner end portions thereof which are on the side of the spool, is provided on an upper portion of the slidable member 21. The outer circumferential portions of the slidable member 21 on either side of the locking recess 24 are shaped so as to form smooth guide surfaces 25.

A pair of guide rods 26, 27 are supported between portions of the frame bases 19 which are slightly above and behind the guide cylinder 14. Right and left guide arms 29, which are provided with line guide recesses 28 in facing surfaces thereof, are each fitted around both guide rods 26, 27. A spring 30 is provided on the portion of the guide rod 26 which is between the guide arms 29. Locking pins 32 project so that they can be retracted by springs 31 from lower portions of the guide arms 29. When the locking pins 32 engage with the locking recess 24, the line guide arms 29 come in contact with each other so that a line guide hole 33 is formed by the guide recesses 28.

Figure 5:
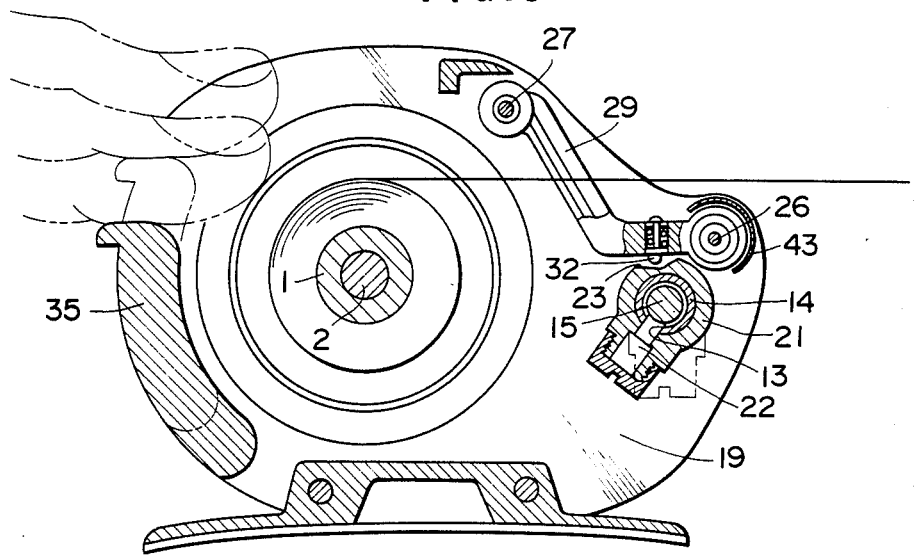
FIG. 5 is a section taken along the line II—II of FIG. 2.
Figure 6:
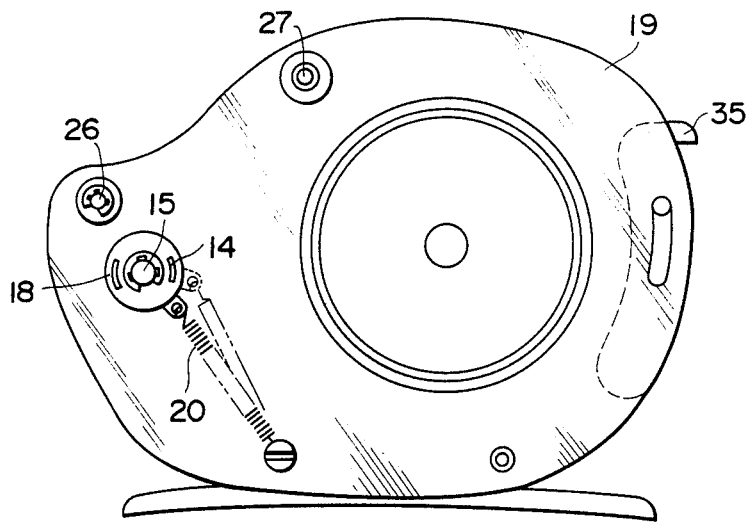
FIG. 6 is a section taken along the line III—III of FIG. 2.
Figure 7:
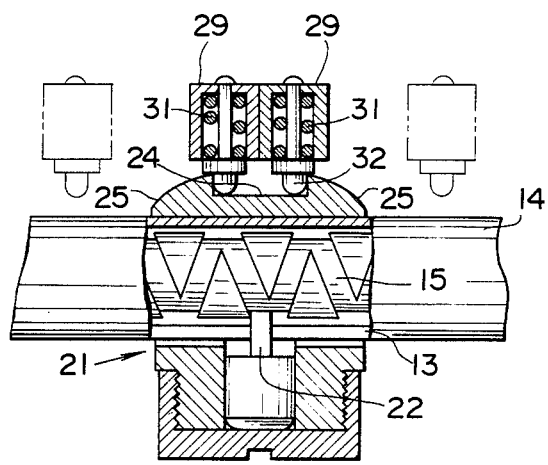
FIGS. 7 and 8 are partially-cutaway views showing the operational relationship between the slidable member of the present invention and the line guide arms thereof.
Figure 8:
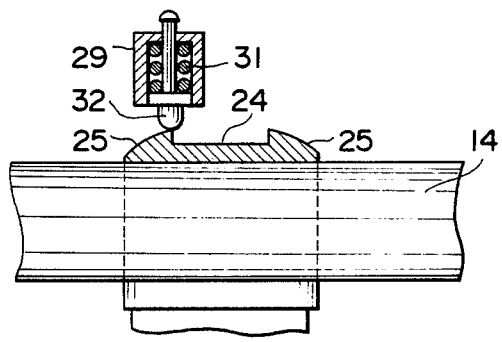
Figure 9:
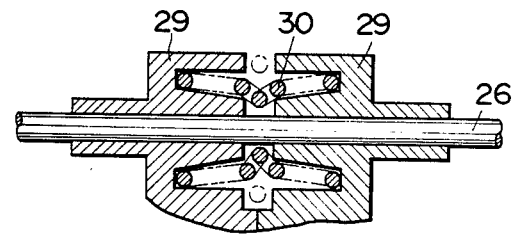
FIGS. 9 and 10 are sections showing the relationship between the line guide arms of the present invention and the guide rod thereof.
Figure 10:
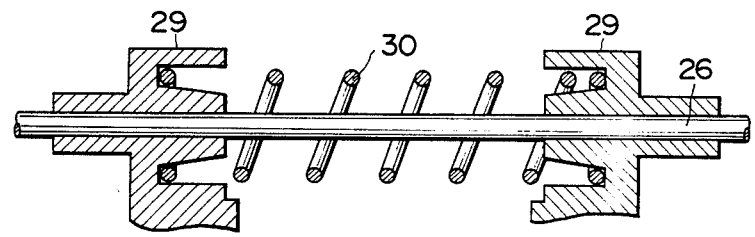
Figure 11:
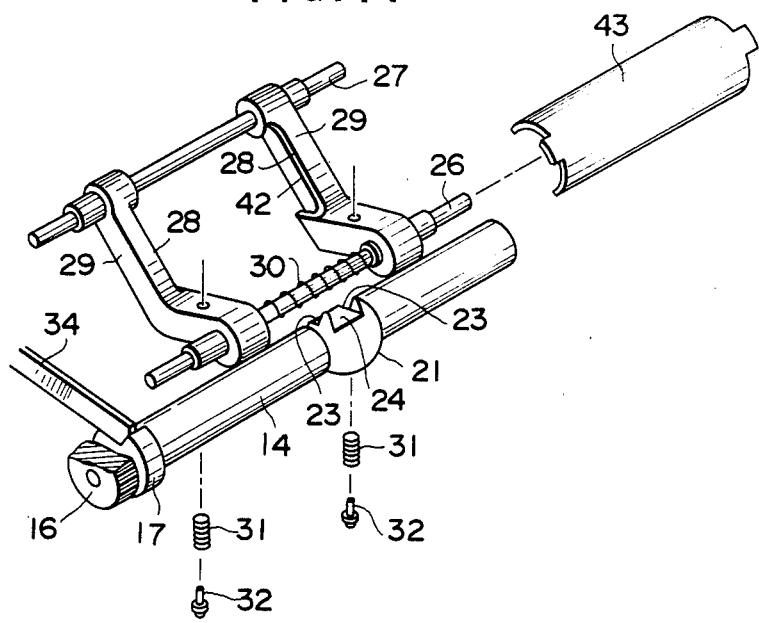
FIG. 11 is a partially-exploded perspective view of the principal portions of the present invention.
Figure 12:
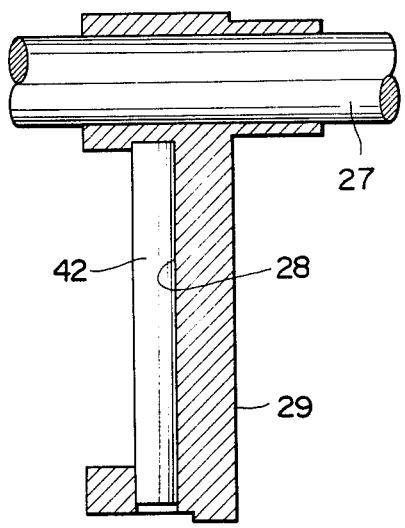
FIG. 12 is a section through the guide portion of a line guide arm of the present invention.
Figure 13:
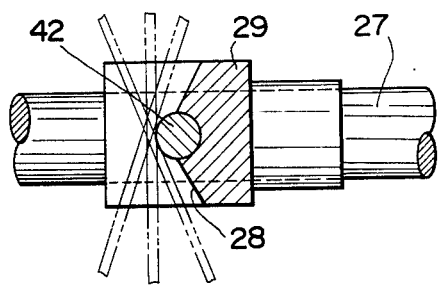
FIG. 13 is a partially-sectioned plan view of the line guide arm of FIG. 12.

An operating arm 34 which can engage with the operating cam 17 is formed integrally with and projects from the end of one side portion of the clutch plate 12. When the clutch plate 12 is pressed toward the inner position to disengage the pinion 7 from the spool shaft 2, the operating arm 34 presses against the operating cam 17 to turn it, so that the slidable member 21 is turned by the guide cylinder 14, as shown in FIG. 5, and the notches 23 in the locking recess 24 release the locking force of the locking pins 32. As a result, the guide arms 29 are urged resiliently to the right and left by the spring 30 to move the guide arms 29 away from each other toward the frame bases 19.

The clutch plate is so formed that it can be operated by an operating lever 35 which extends between portions of the side walls 3, 4 of the reel behind the spool, in such a manner that the operating lever 35 can move vertically.

A clutch-returning means, which is used to return the clutch plate 12 which has slid to its inner position when the operating lever 35 is pressed down, is so formed that the clutch-returning operation can be carried out automatically in accordance with a rotational movement of the handle shaft 5, in a known manner.

A reverse rotation-preventing ratchet wheel 37, which is rotated unitarily with the handle shaft 5, and which is engaged with a locking pawl 36, is provided with kick pins 38 projecting from the surface thereof. When the handle shaft 5 is rotated so that a kick pin 38 engages with an operating member 39 and presses it outward until the rear end of the operating member 39 presses against a locking projection 40 of the clutch plate 12 and move it beyond the dead point of the dead-point spring 11, the clutch plate returns to its outer position. When the clutch plate 12 has returned to its outer position, the operating member 39 is held in a position out of the path of the circular movement of the kick pins 38, as shown in FIG. 3, by a stopper projection 41 provided on the clutch plate 12.

The line guide arms 29 are made of a synthetic resin, and cylindrical members 42 of a wear-resistant material, such as a ceramic material or stainless steel, are attached to the inner side surfaces thereof to prevent wear and damage to the line. A guide cover 43 of a wear-resistant material, such as stainless steel, and which has an arcuate cross-section to prevent abrasion of the line, is attached to an outer portion of the guide rod 26.

This embodiment of the present invention is formed as described above. In order to pay out the line during fishing, the operating lever 35 of the clutch plate 12 is pressed downward to move the clutch plate 12 to its inner position. Consequently, the operating projections 10 urge the operating plate 8 outward to disengage the pinion 7 from the spool shaft 2, and thereby enable the spool 1 to rotate. At the same time, the operating arm 34 of the clutch plate 2 turns the operating cam 17 to rotate the slidable member 21 by the guide cylinder 14, so that the locking pins 32 provided in the line guide arms 29 and which are engaged with the locking recess 24 are disengaged therefrom through the notches 23. As a result, the guide arms 29 are moved away from each other by the force of the spring 30 toward the frame bases 19. Accordingly, the line can be payed out without coming into contact with the cylindrical members 42 attached to the guide arms 29.

When the handle shaft 5 is then rotated in the direction in which the line is wound in the clutch plate 12 is returned to its outer position by the action of a kick pin 38, the operating member 39 and the locking projection 40, so that the pinion 7 is connected to the spool shaft 2 to enable the winding in of the line. At the same time, the operating arm 34 is moved back so that the operating cam 17 makes the guide cylinder 14 and slidable member 21 return to their original positions. During this time, the traverse cam shaft 15 is rotated to make the slidable member 21 move reciprocally in the lateral direction. The slidable member 21 is first moved to one line guide arm 29 so that the corresponding locking pin 32 is retracted by that guide surface 25 of the locking recess 24, and the locking pin 32 engages with the recess 24. The slidable member 21 is then moved to the other line guide arm 29 so that the corresponding locking pin 32 engages with the locking recess 24 over that guide surface 25 in the same manner. Consequently, the line guide arms 29 are connected together to form a line guide hole 33 therebetween, through which the line is guided as it is wound onto the spool 1.

The position of the clutch-operating lever 35 and the construction of the clutch means and clutch-returning means are not limited to those specified in this embodiment.

The present invention is not, of course, limited to this embodiment, it can be modified in various ways within the scope of the appended claims.

What is claimed is:

1. In a double-bearing reel for a fishing rod, said reel having side walls, frame bases on said side walls, a handle shaft and a spool shaft supported rotatably between side walls of said reel with a spool attached therearound; a driving gear on said handle shaft; a pinion, mounted on one end portion of said spool shaft, for meshing with said driving gear, said pinion engaging with, and disengaging from, said spool shaft; clutch means for causing said pinion to unitarily engage with, and disengage from, said spool shaft; and clutch-returning means for actuating said clutch means when said handle shaft is rotated in the direction in which a fishing line is wound in, whereby said pinion can be disengaged from, and unitarily engaged with, said spool shaft; a level winder comprising a traverse cam shaft held between portions of said frame bases on said side walls in front of said spool, said traverse cam shaft being rotated by said driving gear mounted on said handle shaft; a guide cylinder mounted around an outer portion of said traverse cam shaft and rotatably supported between said frame bases; a slidable member mounted around said guide cylinder for rotating unitarily with said guide cylinder and moving along said guide cylinder reciprocally in a lateral direction; a locking recess formed in said slidable member; smooth guide surfaces formed on portions of said slidable member on either side of said locking recess; notches formed in portions of said guide surfaces on the side thereof toward said spool; a pair of guide rods supported between said side walls; right and left line guide arms mounted slidably on said guide rods and urged resiliently in opposite directions by a spring; and locking pins projecting from said guide arms, said locking pins being retractable into said guide arms, and defining means for engaging said locking recess so that a fishing line guide portion is formed between said two guide arms; said locking pins being disengaged from said locking recess through said notches when said slidable member is rotated.

2. In a double-bearing reel for a fishing rod provided with side walls, frame bases on said side walls, a handle shaft and a spool shaft supported rotatably between said side walls of said reel with a spool attached therearound; a driving gear on said handle shaft; a pinion, mounted on one end portion of said spool shaft, for meshing with said driving gear, said pinion engaging with, and disengaging from, said spool shaft; clutch means for causing said pinion to unitarily engage with, and disengage from, said spool shaft; and clutch-returning means for actuating said clutch means when said handle shaft is rotated in the direction in which a fishing line is wound in, whereby said pinion can be disengaged from, and unitarily engaged with, said spool shaft; a level winder comprising a traverse cam shaft held between portions of said frame bases on said side walls in front of said spool, said traverse cam shaft being rotatably engaged by said driving gear mounted on said handle shaft; a guide cylinder mounted around an outer portion of said traverse cam shaft and rotatably supported between said frame bases; a slidable member mounted around said guide cylinder for rotating unitarily with said guide cylinder and moving along said guide cylinder reciprocally in a lateral direction; a locking portion formed in said slidable member; a pair of guide rods supported between said side walls; right and left line guide arms mounted slidably on said guide rods, including a spring for resiliently urging said guide arms in opposite directions, said guide arms being engageable with said locking portion to form a line guide portion between said arms, and said guide arms being disengageable from said locking portion when said slidable member is rotated; an operating cam provided at one end portion of said guide cylinder; and a clutch plate provided within said clutch means, said clutch plate having an operating arm engageable with said operating cam when said pinion connected to said spool is disengaged therefrom, to turn said guide cylinder, and which simultaneously provides a clutch means operating action and a guide arm opening action.

* * * * *